US012726029B1

(12) United States Patent
Liu

(10) Patent No.: US 12,726,029 B1
(45) Date of Patent: Sep. 1, 2026

(54) POWER SUPPLY AND STORAGE DEVICE

(71) Applicant: Chun-Cheng Liu, Tainan (TW)

(72) Inventor: Chun-Cheng Liu, Tainan (TW)

( * ) Notice: Subject to any disclaimer, the term of this patent is extended or adjusted under 35 U.S.C. 154(b) by 0 days.

(21) Appl. No.: 19/181,071

(22) Filed: Apr. 16, 2025

(51) Int. Cl.
*H02J 3/32* (2026.01)
*H02J 3/001* (2026.01)
*H02J 3/38* (2026.01)
*H02J 7/40* (2026.01)
*H02J 7/50* (2026.01)
*H02J 7/80* (2026.01)
*H02J 7/90* (2026.01)

(52) U.S. Cl.
CPC ................ *H02J 3/32* (2013.01); *H02J 3/001* (2020.01); *H02J 3/38* (2013.01); *H02J 7/40* (2026.01); *H02J 7/50* (2026.01); *H02J 7/80* (2026.01); *H02J 7/933* (2026.01); *H02J 7/977* (2026.01); *H02J 2207/20* (2020.01)

(58) Field of Classification Search
CPC ...... H02J 3/001; H02J 3/32; H02J 3/38; H02J 7/40; H02J 7/50; H02J 7/80; H02J 7/90
See application file for complete search history.

(56) References Cited

U.S. PATENT DOCUMENTS

2022/0200314 A1* 6/2022 Zhou ........................ H02J 7/50
2022/0285950 A1* 9/2022 Ju ............................ H02J 7/52
2022/0344947 A1* 10/2022 Wu .......................... H02J 7/54
2022/0393475 A1* 12/2022 Li ........................... H02J 3/381
2023/0170711 A1* 6/2023 Wang ........................ H02J 7/54
320/118
2023/0420956 A1* 12/2023 Wu .......................... H02J 3/32
2024/0014677 A1* 1/2024 Wu .......................... H02J 7/82
2024/0030724 A1* 1/2024 Li ............................ H02J 7/54

* cited by examiner

*Primary Examiner* — Rexford N Barnie
*Assistant Examiner* — Joseph N Inge
(74) *Attorney, Agent, or Firm* — Che-Yang Chen; Law Office of Michael Chen

(57) ABSTRACT

A power supply and storage device comprises a direct current bus, a power conversion system electrically connected to the DC bus, and plural battery clusters connected in parallel. The power conversion system is electrically connected to a first power supply end and converts one of alternating current and direct current into another of the alternating current and the direct current. Each battery cluster includes plural battery modules connected in parallel. Each battery module includes plural cells connected in series. Each battery cluster includes a bidirectional isolated control module electrically connected to the DC bus. Each bidirectional isolated control module is electrically connected to the battery modules of a respective battery cluster and electrically isolates the DC bus from each battery module. A voltage value of the DC bus is decided by an operating power of the power conversion system and the number of the bidirectional isolated control modules in operation.

10 Claims, 1 Drawing Sheet

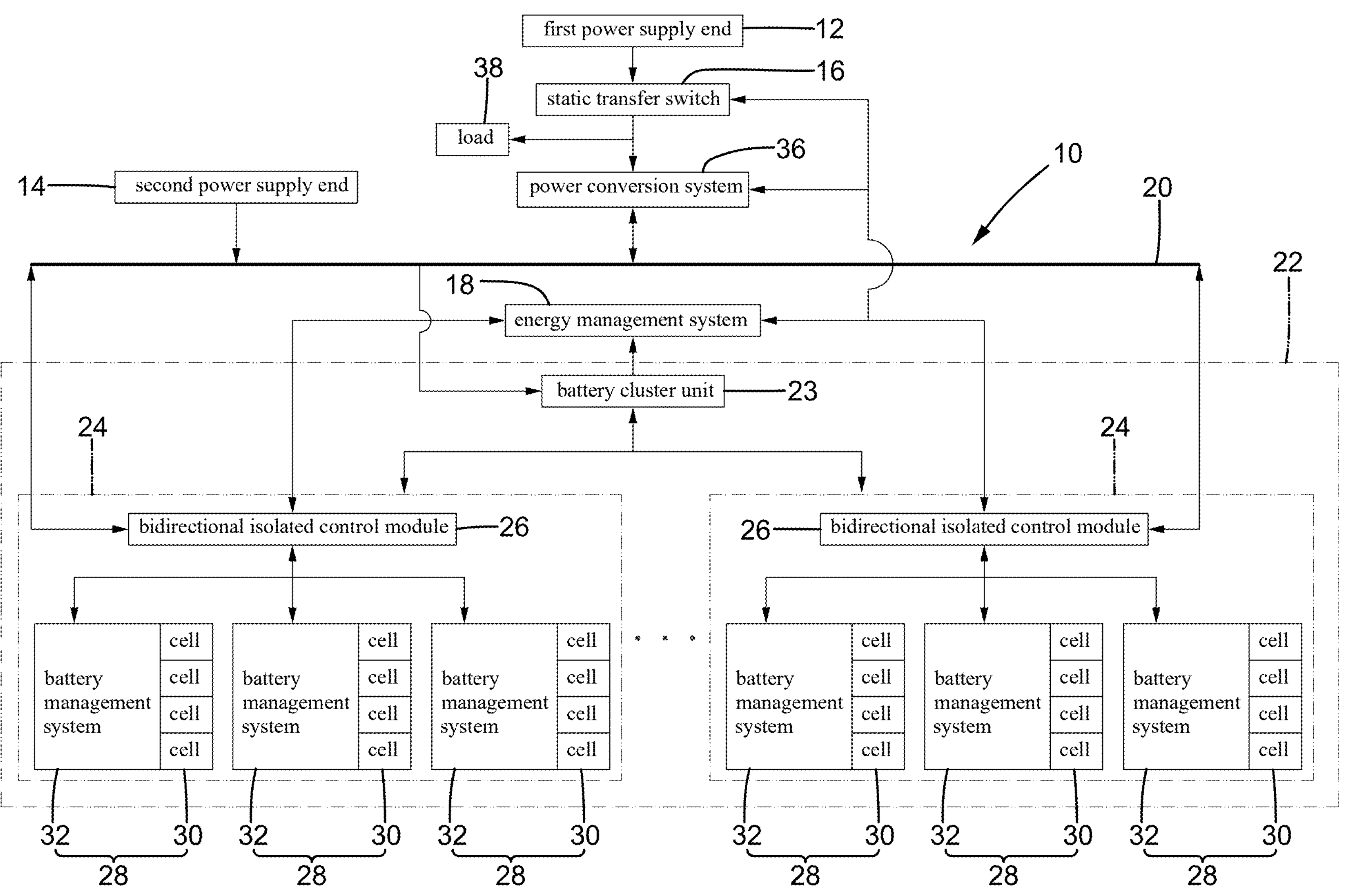
first power supply end
12
38
static transfer switch
16
load
36
10
second power supply end
14
power conversion system
20
22
18
energy management system
battery cluster unit
23
24
24
bidirectional isolated control module
26
26
bidirectional isolated control module
battery management system
cell
32
30
28

POWER SUPPLY AND STORAGE DEVICE

BACKGROUND OF THE INVENTION

The present invention relates to a power supply and storage device and, more particularly, to a power supply and storage device capable of permitting storage of electrical energy including commercial power and green energy (such as solar energy) and supplying power to at least one load at proper timing.

Some factories or enterprises consider disposition of a power supply and storage system (or "power storage system") in view of increase in the utilization efficiency of electrical energy, reduction in the electricity bill, providing timely operation reserve, achieving carbon reduction, etc. The power supply and storage system uses plural batteries to store and provide electrical energy. The power supply and storage system can store commercial power and/or green energy (such as solar energy) at the off-peak hours and can provide power to the equipment of factories or enterprises at proper timing Since the total equipment power of factories or enterprises is greater than ordinary household electricity usage, the quantity of batteries required by the power supply and storage device is huge. Thus, it is not easy to simultaneously monitor and control the voltage, current, temperature, release of chemical gases, etc. during charging and discharging of each of the huge amount of cells. It is also difficult for factories or enterprises to maintain the state of health of the cells for the purposes of reducing the cost of use. Furthermore, an ordinary power supply and storage device generally uses many cells connected in series to provide a sufficiently high voltage (e.g., 700V requires serial connection of 220 cells of 3.2V), and it is difficult to simultaneously monitor and detect so many cells.

BRIEF SUMMARY OF THE INVENTION

The present invention provides a power supply and storage device comprising:

a direct current (DC) bus;

a power conversion system electrically connected to the DC bus, wherein the power conversion system is configured to be electrically connected to a first power supply end and to convert one of alternating current and direct current into another of the alternating current and the direct current; and plural battery clusters connected in parallel, wherein each of the plural battery clusters includes plural battery modules connected in parallel, wherein each battery module includes plural cells connected in series, wherein each battery cluster further includes a bidirectional isolated control module electrically connected to the DC bus, wherein each bidirectional isolated control module is electrically connected to the battery modules of a respective one of the plural battery clusters and electrically isolates the DC bus from each battery module, wherein a voltage value of the DC bus is decided by an operating power of the power conversion system and the number of the bidirectional isolated control modules in operation, and wherein when each bidirectional isolated control module controls charging and discharging of the respective battery cluster according to the voltage value measured on the DC bus, the bidirectional isolated control modules are identical in a charging current value and a charging voltage valve during charging and are identical in a discharging current value and a discharging voltage value during discharging.

The voltage value of the DC bus is decided by the operating power of the power conversion system and the number of the bidirectional isolated control modules in operation. The charging power and the discharging power of each bidirectional isolated control module is decided by the voltage value of the DC bus. Thus, the charging power and the discharging power of each bidirectional isolated control module can be easily controlled through control of the operating power of the power conversion system. Furthermore, each battery module is electrically isolated from the DC bus and the power conversion system via the bidirectional isolated control modules. Thus, hot swapping of each battery module is permitted, thereby permitting replacement and repair of each battery module without stopping the power supply and storage device.

The voltage value of the DC bus is decided by the operating power of the power conversion system and the number of the bidirectional isolated control modules in operation. The charging power and the discharging power of each bidirectional isolated control module is decided by the voltage value of the DC bus. Thus, when the bidirectional isolated control modules of one or more battery clusters malfunction due to some reasons, the power supply and storage device may still operate normally as long as the remaining battery clusters can support the power of the power conversion system.

The battery modules have the same charging current value (the same charging power) when in the charging state and have the same discharging current value (the same discharging power) when in the discharging state. Thus, the states of all cells are similar to increase the system stability of the power supply and storage system while reducing the malfunctioning probability.

The battery modules of each battery cluster are connected in parallel, and the battery clusters are also connected in parallel. Thus, the number of the battery modules and/or the number of the battery clusters can be increased or decreased according to the practical use without changing the voltage value outputted by each battery cluster. As a result, the amount of electricity stored by the power supply and storage device can be adjusted more easily.

Each battery module is electrically isolated from the DC bus and, thus, will not be affected by the DC bus, thereby reducing the damage probability of each battery module.

In an example, a voltage value of the DC bus in operation is between a first voltage value and a second voltage value greater than the first voltage value, wherein a stable voltage value of the DC bus is calculated by equation (1):

$$V_{sc}=(P_1/P_2)*(V_2-V_c)+V_c \quad (1)$$

wherein $V_{sc}$ is the stable voltage value of the DC bus during charging, $V_2$ is the second voltage value, $V_c$ is an initial charging voltage value, $P_2$ is the rated charging power of each bidirectional isolated control module, $P_1$ is a charging power of each bidirectional isolated control module and is equal to $OP/N_b$, wherein OP is an operating power of the power conversion system, and $N_b$ is the number of the bidirectional isolated control modules in operation.

According to equation (1) for calculating the voltage value of the DC bus, given that the operating power of the power conversion system is unchanged, the stable voltage value of the DC bus is changed when the number of the bidirectional isolated control modules in operation is changed, such that the voltage value of the DC bus can be controlled excellently, thereby rapidly controlling the operating power of each bidirectional isolated control module.

In an example, a voltage value of the DC bus in operation is between a first voltage value and a second voltage value greater than the first voltage value, wherein a stable voltage value of the DC bus is calculated by equation (1):

$$V_{sc}=(P_1/P_2)*(V_2-V_c)+V_c \quad (1)$$

wherein $V_{sc}$ is the stable voltage value of the DC bus during charging, $V_2$ is the second voltage value, $V_c$ is an initial charging voltage value, $P_2$ is the rated charging power of each bidirectional isolated control module, $P_1$ is a charging power of each bidirectional isolated control module and is equal to $OP/N_b$, wherein OP is an operating power of the power conversion system, and $N_b$ is the number of the bidirectional isolated control modules in operation.

In an example, the charging current value of each battery module charged by the respective bidirectional isolated control module and the discharging current value of each battery module discharged by the respective bidirectional isolated control module are respectively calculated by equations (3) and (4):

$$I_1=I_2*(V_b-V_c)/(V_2-V_c) \quad (3)$$

$$I_3=I_4*(V_a-V_b)/(V_d-V_1) \quad (4)$$

wherein $I_1$ is the charging current value of each battery module charged by the respective bidirectional isolated control module, $I_2$ is a rated charging current of each battery module, $V_b$ is a measured real-time voltage value of the DC bus, $V_c$ is an initial charging voltage value, $V_2$ is the second voltage value, $I_3$ is the discharging current value, $I_4$ is a rated discharging current of each battery module, $V_d$ is the initial discharging voltage value, and $V_1$ is the first voltage value, and wherein the initial charging voltage value $V_c$ is greater than the initial discharging voltage value $V_d$ by a value in a range of 5-20V.

According to equation (3) for calculating the charging current value of each battery module charged by the respective bidirectional isolated control module and equation (4) for calculating the discharging current value of each battery module discharged by the respective bidirectional isolated control module, the charging power and the discharging power of each battery module can be excellently controlled in a preset range, thereby effectively prolonging the service life of each battery module.

In an example, the number of the plural cells connected in series is in a range of 20-30. The working voltage of each battery module is in a range of 40-60V.

The number of the serially connected cells of each battery module is controlled to be in a range of 10-20, such that the rated voltage value of each battery module is low. For example, the rated voltage of sixteen (16) cells connected in series is 51.2V. Thus, the working temperature of each battery module is not high during charging and discharging, which saves the costs for disposition of an active type cooling system, reducing the risk of electric shock, and reducing the risk of fire due to high temperature.

In an example, each battery module includes a battery management system electrically connected to each cell. Each battery management system controls a voltage value of each cell after charging to be within a range of allowable error which is ±0.01V-±0.1V.

The battery management system of each battery module may at least monitor the real-time temperature and the real-time voltage of each cell, such that the power supply and storage device may reliably monitor the operating state of each cell, thereby increasing the overall stability while permitting timely repair and/or replacement of the battery module having malfunctioning cells.

In an example, each battery module includes a battery management system electrically connected to each cell. Each battery management system monitors operational data of each cell including at least a real-time temperature of each cell. When the real-time temperature of one of the plural cell is higher than a preset temperature, a respective one of the bidirectional isolated control modules associated with the one of the plural cells whose real-time temperature is higher than the preset temperature stops charging and/or discharging of a respective one of the plural battery modules associated with the one of the plural cells whose real-time temperature is higher than the preset temperature.

In an example, the power supply and storage device further comprises:

an energy management system electrically connected to the power conversion system and each bidirectional isolated control module, wherein when each battery cluster is charging, the energy management system controls the power conversion system to convert the alternating current supplied by the first power supply end into the direct current which is supplied to the DC bus, wherein each bidirectional isolated control module uses the direct current of the DC bus to charge the respective battery modules, wherein when each battery cluster is discharging, the respective bidirectional isolated control module uses electricity of the respective battery cluster to generate direct current at the DC bus, and wherein the power conversion system converts the direct current generated at the DC bus into alternating current to be used by at least one load; and a battery cluster unit electrically connected between the energy management system and each battery cluster, wherein each battery module includes a battery management system electrically connected to each cell, wherein the battery management system of each battery module captures an operational data of each of the associated cells and sends the operational data to the battery cluster unit, wherein the battery cluster unit sends the operational data to the energy management system, wherein the operation data includes a real-time voltage value and a real-time temperature of each of the associated cells, wherein when the energy management system detects that one of the plural cells has an abnormal real-time voltage value, a respective one of the bidirectional isolated control modules associated with the one of the plural cells having the abnormal temperature stops charging and/or discharging of the respective one of the battery modules associated with the one of the plural cells having the abnormal temperature.

The power supply and storage device monitors the cells via the respective battery management system and then sends the data (associated with operation of the cells) back to the battery cluster unit. Next, the battery cluster unit organizes the monitored data associated with operation of the cells and then send the organized data to the energy management system, such that the power supply and storage device can excellently manage a large quantity of cells.

In an example, the power supply and storage device further comprises a second power supply end comprised of at least one of a green energy system and a recycling power generating system. The second power supply end is electrically connected to the DC bus and is configured to be electrically connected to at least one load. The first power supply end supplies alternating current. The power conversion system converts the alternating current of the first power supply end into direct current which is delivered to the DC bus. Each bidirectional isolated control module uses the direct current of the DC bus to charge each battery cluster. The power conversion system is capable of converting the direct current released from each battery cluster into alternating current to be supplied to the at least one load.

The power supply and storage device according to the present invention may cooperate with the first power supply end (such as a commercial power) providing alternating current and the second power supply end (such as a solar power generating system) providing direct currently, thereby effectively increasing the use efficiency of electrical energy.

In an example, the power supply and storage device further comprises:

an energy management system electrically connected to the power conversion system and each bidirectional isolated control module, wherein when the energy management system controls the power conversion system to convert the alternating current supplied by the first power supply end into the direct current and delivers the direct current to the DC bus, each bidirectional isolated control module uses the direct current of the DC bus to charge the respective battery modules, wherein when the energy management system controls the power conversion system to supply electricity to at least one load, each bidirectional isolated control module uses the electricity of the respective battery cluster to generate direct current on the DC bus, and wherein the power conversion system converts the direct current generated on the DC bus into alternating current to be supplied to the at least one load; and a battery cluster unit electrically connected between the energy management system and each battery cluster, wherein the battery cluster unit is configured to detect whether each battery cluster generates at least one of smoke, flammable gases, volatile organic compounds, carbon monoxide, and hydrogen, and wherein when presence of any one of the generates smoke, flammable gases, volatile organic compounds, carbon monoxide, and hydrogen is detected by the battery cluster unit, the energy management system stops operation of each bidirectional isolated control module, such that all battery modules stop charging and discharging.

The battery cluster unit independently detects whether the whole power storage system generates smoke, flammable gases, volatile organic compounds, carbon monoxide, and/or hydrogen, assuring high safety during operation of the power supply and storage device.

The present invention will become clearer in light of the following detailed description of illustrative embodiments of this invention described in connection with the drawings.

DESCRIPTION OF THE DRAWINGS

FIG. 1 is a diagrammatic view of a power supply and storage device according to the present invention.

Where used in the various figures of the drawings, the same numerals designate the same or similar parts. Furthermore, when the terms “first”, “second”, “end”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

The present invention relates to a power supply and storage device 10 which can store electrical energy and can supply the electrical energy to a load when desired. With reference to FIG. 1, the power supply and storage device 10 comprises at least one power storage system 22. The power storage system 22 includes plural battery clusters 24 connected in parallel. It is worth noting that the number of the battery clusters 24 of the at least one power storage system 22 may be increased or decreased according to the practical need. In a case that plural power storage systems 22 are used, the power storage systems 22 are connected in parallel. Furthermore, since the battery clusters 24 are connected in parallel, increasing or decreasing the number of the battery clusters 24 only changes the electricity of the power storage system 22. It can be appreciated that a change in the number of the power storage systems 22 only changes the electricity stored by the power supply and storage device 10.

The power storage system 22 further includes a battery cluster unit (BCU) 23 connected to the battery clusters 24 in series. The battery cluster unit 23 is electrically connected to an energy management system (EMS) 18. The battery cluster unit 23 has built-in electrochemical sensors which may but not limited to monitor whether each battery cluster 24 generates smoke, flammable gases, volatile organic compounds, carbon monoxide, and/or hydrogen. The energy management system 18 may but not limited to include a computer host, necessary input interfaces (such as a keyboard and a mouse), and a monitor. The computer host may receive data of each component of the power supply and storage device 10 via various communication interfaces and may send control commands to each component of the power supply and storage device 10.

Each battery cluster 24 includes plural battery modules 28 connected in parallel. Each battery module 28 includes a battery management system 32 and plural cells 30 connected in series. For example, each battery module 28 may but not limited to include sixteen (16) cells 30 connected in series. Each cell 30 has a voltage of about 3.2V. Thus, the rated voltage value of each battery module 28 is 51.2V.

It is worth noting that since the battery modules 28 of each battery cluster 24 are connected in parallel, the number of the battery modules 28 of each battery cluster 24 may be increased or decreased according to the practical need, and the increase or decrease in the number of the battery modules 28 only changes the amount of electricity stored in the battery cluster 24 without changing the rated voltage value of the battery cluster 24. Since the battery modules 28 are connected in parallel and the battery clusters 24 are connected in parallel, a change in the number of the battery clusters 24 or the battery modules 28 only affects the amount of electricity stored by the power storage system 22 without affecting the rated voltage value of the power storage system 22. Namely, the amount of electricity stored by the power storage system 22 may be increased or decreased without changing the rated voltage value.

Furthermore, although the number of the battery modules 28 of each battery cluster 24 may be changed, the battery clusters 24 preferably have the number of the battery modules 28 when the power supply and storage device 10 is built. Furthermore, the battery clusters 24 may be identical in the amount of stored electricity, the charging current value, the charging voltage value, the discharging current value, and the discharging voltage value.

When it is desired to change the rated voltage value of the power storage system 22, the number of the serially connected cells 30 in each battery module 28 is changed. Namely, the more the serially connected cells 30 in each battery module 28, the higher the rated voltage of each battery cluster 24. It is worth noting that the power supply and storage device 10 according to the present invention may but not limited to use low voltage. For example, the rated voltage of the power storage system 22 is 51.2V. Thus, the number of the serially connected cells 30 in each battery module 28 is preferably 10-20. In an embodiment according to the present invention, each battery module 28 preferably includes sixteen (16) cells 30 connected in series, and the rated voltage of each battery module 28 is preferably 51.2V.

The battery management system 32 of each battery module 28 is disposed to include a voltage balancing function and a monitoring function. For example, each battery management system 32 is provided with a passive voltage balancing board or an active voltage balancing board, such that the voltage value of each cell 30 of each battery module 28 after charging maintains within the range of allowable error. The range of allowable error of each cell 30 after charging is ±0.01V-±0.1V. For example, in a case that the rated voltage of each cell 30 is 3.2V, the float voltage value of each cell 30 after charging in a range of 3.21V-3.19V is acceptable when the range of allowable error is ±0.01V or in a range of 3.3V-3.1V is acceptable when the range of allowable error is ±0.1V.

The monitoring function of battery management system 32 of each battery module 28 includes monitoring "operational data" of each cell 30. The operational data includes at least a real-time voltage and a real-time temperature of each cell 30. Each battery management system 32 captures the operational data of the respective cells 30 to the battery cluster unit 23 and sends the operational data to the battery cluster unit 23. The battery cluster unit 23 may organize the operational data of each battery management system 32 and then compress the operational data before sending to the energy management system 18, such that the energy management system 18 may display the data associated with the operation status of the power supply and storage device 10 via a display.

Each battery cluster 24 includes a bidirectional isolated control module 26. The bidirectional isolated control module 26 of each battery cluster 24 is serially connected to each battery module 28 of the battery cluster 24, such that the battery modules 28 are connected in parallel. Each battery module 28 of each battery cluster 24 may output direct current to the respective bidirectional isolated control module 26 for operation. Furthermore, each bidirectional isolated control module 26 is electrically connected to the energy management system 18. Thus, the energy management system 18 may send signals and/or commands to each bidirectional isolated control module 26. Namely, the energy management system 18 may control operation of each bidirectional isolated control module 26. Furthermore, the bidirectional isolated control module 26 is preferably comprised of a bidirectional isolated DC-DC converter.

The power supply and storage device 10 further comprises a direct current bus (DC bus) 20. The bidirectional isolated control module 26 of each battery cluster 24 is serially connected to the DC bus 20. The bidirectional isolated control modules 26 of the battery clusters 24 are connected in parallel. The bidirectional isolated control module 26 of each battery cluster 24 is electrically connected to each battery module 28 of the battery cluster 24 and the DC bus 20. Thus, the DC bus 20 and each battery module 28 do not interfere with each other. Thus, it can be appreciated that although the battery clusters 24 are connected in parallel, but each battery module 28 of any battery cluster 24 is isolated from each battery module 28 of the other battery cluster 24 (or other battery clusters 24 when more battery clusters 24 are used). Thus, the battery modules 28 of each battery cluster 24 do not interfere with each other. Furthermore, the battery cluster unit 23 is electrically connected to the DC bus 20 to detect the real-time voltage value and report it to the energy management system 18. Furthermore, when plural power storage systems 22 are used, since each bidirectional isolated control module 26 is connected to the DC bus 20 in series, the bidirectional isolated control modules 26 are connected in parallel, and the plural power storage systems 22 are connected in parallel.

Furthermore, the DC bus 20 is electrically connected to a power conversion system 36. The power conversion system 36 is electrically connected to the energy management system 18 and a static transfer switch 16. The static transfer switch 16 is electrically connected to a first power supply end 12. The static transfer switch 16 is electrically connected to at least one load 38 via a power supply circuit between the static transfer switch 16 and the power conversion system 36. The first power supply end 12 may be but not limited to a power grid or commercial power to provide alternating current. The static transfer switch 16 may receive commands from the energy management system 18 to switch between a conductive state and a non-conductive state. It can be appreciated that when the static transfer switch 16 is in the conductive state, the at least one load 38 may directly use the electricity of the first power supply end 12. When the static transfer switch 16 is in the non-conductive state, the at least one load 38 is disconnected from the first power supply end 12.

The power conversion system 36 is used to covert direct current into alternating current or convert alternating current into direct current. The power conversion system 36 adjusts the voltage value and the current value to the desired magnitude required by the load 38 while proceeding conversion between direct current and alternating current. When the bidirectional isolated control module 26 of each battery cluster 24 charges each battery module 28, the energy management system 18 controls the power conversion system 36 to convert alternating current of the first supply end 12 into direct current. The direct current outputted by the power conversion system 36 is delivered to the DC bus 20. Thus, each bidirectional isolated control module 26 uses the direct current on the DC bus 20 to operate, thereby charging each battery module 28.

It is worth noting that since each bidirectional isolated control module 26 is electrically connected between the DC bus 20 and the respective battery modules 28, each battery module 28 is substantially electrically isolated from the DC bus 20.

When the bidirectional isolated control module 26 of each battery cluster 24 uses the respective battery modules 28 to discharge to the DC bus 20, the power conversion system 36 uses the direct current from the DC bus 20 to operate and coverts it into alternating current. Furthermore, power conversion system 36 adjusts the voltage value of the outputted alternating current to a magnitude (such as 110V, 220V, or 380V, which is different in different countries or areas) required by the at least one load 38. Nevertheless, when the static transfer switch 16 is in either of the conductive state and non-conductive state, the at least one load 38 may use the alternating current outputted by the power conversion system 36 to operate.

The static transfer switch 16 remains in the conductive state when the first power supply end 12 continuously supplies power. Only when the first power supply end 12 cannot supply power normally (such as outage), the energy management system 18 will switch the static transfer switch 16 into the non-conductive state. When the static transfer switch 16 is switched into the non-conductive state, the power supply and storage device 10 is disconnected from the first power supply end 12 to assure that the power supply and storage device 10 will not permit the first power supply end 12 to absorb the electricity of each battery module 28 when the first power supply end 12 cannot supply power while ach battery module 28 is discharging.

The first power supply end 12 may be but not limited to be electrically connected to a second power supply end 14. In a case that the first power supply end 12 is commercial power which supplies alternating current, the second power supply end 14 may be a green energy system or recycling power generating system. For example, the second power supply end 14 may be a power supply end supplying direct current, such as a solar energy system, wind power generating system, or fuel battery system. The power conversion system 36 may convert the direct current of the second power supply end 14 into alternating current which may be supplied to the at least one load 38, such that the at least one load 38 may operate under the electricity from the second power supply end 14.

The bidirectional isolated control module 26 of each battery cluster 24 may also use the electricity supplied by the second power supply end 14 via the DC bus 20 to thereby charge each battery module 28. Furthermore, the voltage value of the direct current supplied by the second power supply end 14 is adjusted by itself. For example, in a case that the second power supply end 14 is a solar power generating system, the direct current generated by the solar power generating system may be adjusted to provide a suitable voltage value and a suitable current value. Thus, it can be appreciated that the power supply and storage device 10 according to the present invention may use the electricity of the first power supply end 12 and/or the second power supply end 14 to charge each battery module 28.

In the power supply and storage device 10 according to the present invention, in order to permit each bidirectional isolated control module 26 to control the charging power and discharging power of each battery module 28, the bidirectional isolated control modules 26 are set to have the same initial charging voltage value and the same initial discharging voltage value. The initial charging voltage value is smaller than a second voltage value and greater than the initial discharging voltage value. The initial discharging voltage value is greater than a first voltage value and is smaller than the initial charging voltage value. In a known preferred embodiment according to the present invention, to avoid each bidirectional isolated control module 26 from frequent switching between charging and discharging, the initial charging voltage value is greater than the initial discharging voltage value by a value in a range of 5-20V. For example, the initial charging voltage value may be but not limited to be greater than the initial discharging voltage value by 10V.

The power supply and storage device 10 may set the working voltage of the DC bus 20 to a value between the first voltage and the second voltage higher than the first voltage. For example, the magnitudes of the first voltage and the second voltage may but not limited to be decided by the total rated power of all of the loads on the operation site.

Furthermore, when battery module 28 is charging or discharging, the real-time voltage of the DC bus 20 is related to the operating power of the power conversion system 36 (controlled by the energy management system 18) and the number of the bidirectional isolated control modules 26 in operation. Specifically, when each battery module 28 is charging, the stable voltage value of the DC bus 20 can be calculated by the following equation (1).

$$V_{sc}=(P_1/P_2)*(V_2-V_c)+V_c \quad (1)$$

wherein $V_{sc}$ is the stable voltage value of the DC bus 20 during charging, $V_2$ is the second voltage value, $V_c$ is the initial charging voltage value, $P_2$ is the rated charging power of each bidirectional isolated control module 26, $P_1$ is the charging power of each bidirectional isolated control module 26 and is equal to $OP/N_b$, wherein OP is the operating power of power conversion system 36, and $N_b$ is the number of the bidirectional isolated control modules 26 in operation.

For example, when each battery module 28 is charging, it is assumed that the preset first voltage $V_1$ is 700V, the present second voltage $V_2$ is 800V, the preset initial charging voltage value $V_c$ is 750V, the rated charging power $P_2$ of each bidirectional isolated control module 26 is 5 KW, the operating power outputted to the DC bus 20 from the power conversion system 36 under control of the energy management system 18 is constant 10 KW, and there are ten (10) bidirectional isolated control modules 26 in total. Thus, the charging power of each bidirectional isolated control module 26 after equal division of the power of the power conversion system 36 is 1 KW. In this state, the stable voltage value $V_{sc}$ of the DC bus 20=(⅕)×(800−750)+750=760V. The stable voltage value $V_{sc}$ of the DC bus 20 refers to the voltage value of the DC bus 20 when each power conversion system 36 and each bidirectional isolated control module 26 reach a stable operating state.

In continuation of this example of charging, assuming one of the ten bidirectional isolated control modules 26 stops operation (such as failure of an associated battery module 28), the remaining nine bidirectional isolated control modules 26 share the power of the power conversion system 36. Namely, each of the remaining nine bidirectional isolated control modules 26 obtains a power of 1.11 KW. Thus, the stable voltage value $V_{sc}$ of the DC bus 20=(1.11/5)×(800−750)+750=761.1V. Thus, it can be appreciated that the power conversion system 36 converts the alternating current from the first power supply end 12 into direct current which is supplied to the DC bus 20 (without changing the power supplied to the DC bus 20) while the number of the bidirectional isolated control modules 26 in practical operation is changed. As a result, the stable voltage value Vs of the DC bus 20 is changed.

Assuming that the first voltage value $V_1$ is 700V, the second voltage value $V_2$ is 800V, the initial charging voltage value $V_c$ is set to 750V, the rated charging power $P_2$ of each bidirectional isolated control module 26 is 5 KW, the operating power outputted to the DC bus 20 from the power conversion system 36 under control of the energy management system 18 is constant 20 KW, and there are ten (10) bidirectional isolated control modules 26 in total. Thus, the charging power $P_1$ of each bidirectional isolated control module 26 after equal division is 2 KW. In this state, the stable voltage value $V_{sc}$ of the DC bus 20=(⅖)×(800−750)+750=770V. Thus, it can be appreciated that a change in the power supplied from the power conversion system 36 to the DC bus 20 will also cause a change in the stable voltage value $V_{sc}$ of the DC bus 20.

When each battery module 28 is discharging, the stable voltage value of the DC bus 20 can be calculated by the following equation (2).

$$V_{sd}=V_d-(P_3/P_4)*(V_d-V_1) \quad (2)$$

wherein $V_{sd}$ is the stable voltage value of the DC bus 20 during discharging, $V_d$ is the initial discharging voltage value, $P_4$ is the rated discharging power of the bidirectional isolated control module 26, $V_1$ is the first voltage value, $P_3$ is the practical discharging power of each bidirectional isolated control module 26 and is equal to $OP/N_b$, wherein OP is the operating power of power conversion system 36, and $N_b$ is the number of the bidirectional isolated control modules 26 in operation.

In the case that each battery module 28 is discharging, assuming that the first voltage value $V_1$ is 700V, the second voltage value $V_2$ is 800V, the initial discharging voltage value $V_d$ is set to 740V, the rated discharging power $P_4$ of each bidirectional isolated control module 26 is 5 KW, the operating power outputted to the at least one load 38 from the power conversion system 36 under control of the energy management system 18 is constant 10 KW, and there are ten (10) bidirectional isolated control modules 26 in total. Thus, the discharging power $P_3$ of each bidirectional isolated control module 26 after equal division is 1 KW. In this state, the stable voltage value $V_{sd}$ of the DC bus 20=740−(⅕)×(740−700)=731.12V.

In continuation of this example of discharging, assuming one of the ten bidirectional isolated control modules 26 stops operation (such as failure of an associated battery module 28), the remaining nine bidirectional isolated control modules 26 share the power of the power conversion system 36. Namely, each of the remaining nine bidirectional isolated control modules 26 has to output 1.11 KW (the discharging power $P_3$). Thus, the stable voltage value of the DC bus 20=740−(1.11/5)×(740−700)=731.12V. Thus, it can be appreciated that the power conversion system 36 converts the direct current from each battery cluster 24 into alternating current which is supplied to the at least one load 38 without changing the power while the number of the bidirectional isolated control modules 26 in practical operation is changed. As a result, the stable voltage value $V_{sd}$ of the DC bus 20 is changed.

Assuming that the first voltage value $V_1$ is 700V, the second voltage value $V_2$ is 800V, the initial discharging voltage value $V_d$ is set to 740V, the rated discharging power $P_4$ of each bidirectional isolated control module 26 is 5 KW, the operating power outputted to the at least one load 38 from the power conversion system 36 under control of the energy management system 18 is constant 20 KW, and there are ten (10) bidirectional isolated control modules 26 in total. Thus, the discharging power $P_3$ of each bidirectional isolated control module 26 after equal division is 2 KW. In this state, the stable voltage value $V_{sd}$ of the DC bus 20=740−(⅖)×(740−700)=724V. Thus, it can be appreciated that a change in the power supplied from the power conversion system 36 to the at least one load 38 will also cause a change in the stable voltage value Vs of the DC bus 20.

Thus, when each battery module 28 is discharging, each bidirectional isolated control module 26 will charge each of the respective battery modules 28 with the same charging voltage valve, the same charging current value, and the same charging power according to the measured real-time voltage value $V_b$ of the DC bus 20. Since the charging current value and the charging voltage value (or charging power) are adjusted according to the voltage value of the DC bus 20 while each bidirectional isolated control module 26 is charging each of the respective battery modules 28, it can be appreciated that the charging voltage value and the charging current value of each battery module 28 charged by the respective bidirectional isolated control module 26 are identical. Namely, the powers at the same time are identical (the charging powers are equally divided) while each battery module 28 is charging. For example, the charging current value is 50 A at the same time, the charging voltage value is 50V at the same time, and the charging power is 2.5 KW at the same time when each battery module 28 of each battery cluster 24 is charging.

When each battery module 28 is discharging, each bidirectional isolated control module 26 will control the discharging voltage value and the discharging current value of each battery module 28 according to the measured real-time voltage value of the DC bus 20. Since the discharging current value and the discharging voltage value (or discharging power) are adjusted according to the voltage value of the DC bus 20 while each bidirectional isolated control module 26 is controlling discharging of each battery module 28, it can be appreciated that the discharging voltage value and the current value of each battery module 28 controlled by the respective bidirectional isolated control module 26 are the same. Namely, the powers at the same time are identical (the discharging powers are equally divided) while each battery module 28 is discharging.

The equations associated with charging and discharging of each battery module 28 are written into the energy management system 18. The charging current value of each battery module 28 charged by the respective bidirectional isolated control module 26 and the discharging current value of each battery module 29 discharged by the respective bidirectional isolated control module 26 can be respectively calculated by the following equations (3) and (4).

$$I_1=I_2*(V_b-V_c)/(V_2-V_c) \quad (3)$$

$$I_3=I_4*(V_a-V_b)/(V_d-V_1) \quad (4)$$

wherein $I_1$ charging current value of each battery module 28 charged by the respective bidirectional isolated control module 26, $I_2$ is the rated charging current of each battery module 28, $V_b$ is the measured real-time voltage value of the DC bus 20, $V_c$ is the initial charging voltage value, $V_2$ is the second voltage value, $I_3$ is the discharging current value, $I_4$ is the rated discharging current of each battery module 28, $V_d$ is the initial discharging voltage value, and $V_1$ is the first voltage value.

For example, it is assumed that the first voltage value $V_1$ is set to 700V, the second voltage value $V_2$ is set to 800V, the initial charging voltage value Cc is set to 750V, the initial discharging voltage value $V_d$ is 740V, the rated charging current $I_2$ of each battery module 28 is 50 A, and the rated charging power $P_2$ of each bidirectional isolated control module 26 is 5 KW. When the energy management system 18 controls the power conversion system 36 to convert the alternating current from the first power supply end 12 into direct current by a power of 10 KW, and the direct current is outputted to the DC bus 20, each of ten (10) bidirectional isolated control modules 26 obtains a charging power $P_1$ of 1 KW after equal division. The stable voltage value $V_{sc}$ of the DC bus 20=(⅕)×(800−750)+750=760V. Since the real-time voltage $V_b$ of the DC bus 20 is greater than the initial charging voltage value $V_c$ (750V), when each bidirectional isolated control module 26 uses the power from the DC bus 20 to proceed with the charging procedure on each battery module 28, the charging current value $I_1$ of each battery module 28 charged by the respective bidirectional isolated control module 26 can be calculated by equation (3). Namely, $I_1$=50×((760−750)/(800−750))=10 A. Therefore, given that the stable voltage value $V_{sc}$ of the DC bus 20 is 760V, the charging current value $I_1$ of each battery module 28 is 10 A. Each bidirectional isolated control module 26 further controls each battery module 28 to have the same charging voltage value. Thus, the charging power of each bidirectional isolated control module 26 is 1 KW.

In an example, it is assumed that the first voltage value $V_a$ is set to 700V, the second voltage value $V_2$ is set to 800V, the initial charging voltage value $V_c$ is set to 750V, the initial discharging voltage value $V_d$ is 740V, the rated charging current $I_2$ of each battery module 28 is 50 A, and the rated charging power $P_2$ of each bidirectional isolated control module 26 is 5 KW. When the energy management system 18 controls the power conversion system 36 to convert the alternating current from the first power supply end 12 into direct current by a power of 50 KW, and the direct current is outputted to the DC bus 20, each of ten (10) bidirectional isolated control modules 26 obtains a charging power $P_1$ of 5 KW after equal division. The stable voltage value $V_{sc}$ of the DC bus 20=(5/5)×(800−750)+750=800V. Since the real-time voltage $V_b$ of the DC bus 20 is greater than the initial charging voltage value $V_c$ (750V), when each bidirectional isolated control module 26 uses the power from the DC bus 20 to proceed with the charging procedure on each battery module 28, the charging current value $I_1$ of each battery module 28 charged by the respective bidirectional isolated control module 26 is calculated by equation (3). Namely, $I_1$=50×((800−750)/(800−750))=50 A. Therefore, the stable voltage value $V_{sc}$ of the DC bus 20 is 800V (the power of the power conversion system 36 is 50 KW), the charging current value $I_1$ of each battery module 28 is 50 A. Each bidirectional isolated control module 26 further controls each battery module 28 to have the same charging voltage value. Thus, the charging power $P_1$ of each bidirectional isolated control module 26 is 5 KW.

In another example, it is assumed that the first voltage value $V_1$ is set to 700V, the second voltage value $V_2$ is set to 800V, the initial charging voltage value $V_c$ is set to 750V, the initial discharging voltage value $V_d$ is 740V, the rated discharging current $I_4$ of each battery module 28 is 50 A, and the rated charging power $P_4$ of each bidirectional isolated control module 26 is 5 KW. When the operating power outputted to the at least one load 38 from the power conversion system 36 under control of the energy management system 18 is set to constant 10 KW, each of ten (10) bidirectional isolated control modules 26 must output a discharging power $P_3$ of 1 KW after equal division. The stable voltage value $V_{sd}$ of the DC bus 20 can be calculated by equation (2). Namely, $V_{sd}$=740−(⅕)×(740−700)=732V. Since the real-time voltage $V_b$ of the DC bus 20 is lower than the initial discharging voltage value $V_d$ (740V), when each bidirectional isolated control module 26 uses the power from each battery module 28 to proceed with the discharging procedure on the DC bus 20, the discharging current value $I_3$ of each bidirectional isolated control module 26 carrying out discharging on the DC bus 20 can be calculated by equation (4). Namely, $I_3$=50×((740−732)/(740−700))=10 A. Therefore, given that the stable voltage value Vs of the DC bus 20 is 732V, the discharging current value $I_3$ of each battery module 28 is 10 A. Each bidirectional isolated control module 26 further controls each battery module 28 to have the same discharging voltage value. Thus, the discharging power $P_3$ of each bidirectional isolated control module 26 is 2 KW.

In a further example, it is assumed that the first voltage value $V_1$ is set to 700V, the second voltage value $V_2$ is set to 800V, the initial charging voltage value $V_c$ is set to 750V, the initial discharging voltage value $V_d$ is 740V, the rated discharging current $I_4$ of each battery module 28 is 50 A, and the rated discharging power $P_4$ of each bidirectional isolated control module 26 is 5 KW. When the operating power outputted to the at least one load 38 from the power conversion system 36 under control of the energy management system 18 is set to constant 20 KW, each of ten (10) bidirectional isolated control modules 26 must output a discharging power $P_3$ of 2 KW after equal division. The stable voltage value Vs of the DC bus 20=740−(⅖)×(740−700)=724V. Since the real-time voltage $V_b$ of the DC bus 20 is lower than the initial discharging voltage value $V_d$ (740V), when each bidirectional isolated control module 26 uses the power from each battery module 28 to proceed with the discharging procedure on the DC bus 20, the discharging current value $I_3$ of each battery module 28 discharged by the respective bidirectional isolated control module 26=50×((740−724)/(740−700))=20 A. Therefore, given that the stable voltage value Vs of the DC bus 20 is 724V, the discharging current value $I_4$ of each battery module 28 is 20 A. Each bidirectional isolated control module 26 further controls each battery module 28 to have the same discharging voltage value. Thus, the discharging power $P_3$ of each bidirectional isolated control module 26 is 2 KW.

Thus, it can be appreciated that since the charging power or discharging power of each bidirectional isolated control module 26 will change according to the measured voltage value of the DC bus 20, the bidirectional isolated control modules 26 will have the same charging power or the same discharging power at the same time. Furthermore, the battery modules 28 are serially connected to the respective bidirectional isolated control module 26 in parallel, such that the charging power and the discharging power of each battery module 28 are the same.

In certain special cases, when the voltage value of the DC bus 20 measured by the battery cluster unit 23 is higher than the second voltage value $V_2$ or lower than the first voltage value $V_1$, the battery cluster unit 23 sends a message indicative of overvoltage of the DC bus 20 to the energy management system 18, and each bidirectional isolated control module 26 stops charging each battery module 28. Each bidirectional isolated control module 26 is disconnected from the DC bus 20 until the voltage of the DC bus 20 restores to a value between the first voltage value $V_1$ and the second voltage value $V_2$. Since each battery module 28 is electrically isolated from the DC bus 20, each battery module 28 will not be affected by the overvoltage and undervoltage of the DC bus 20.

Furthermore, the battery cluster unit 23 monitors whether each battery clusters 24 generates smoke, flammable gases, volatile organic compounds, carbon monoxide, and/or hydrogen. For example, the battery cluster unit 23 is provided with an electrochemical sensor to detect the smoke, flammable gases, volatile organic compounds, carbon monoxide, and/or hydrogen. When any of the smoke, flammable gases, volatile organic compounds, carbon monoxide, and/or hydrogen is detected by the battery cluster unit 23, the battery cluster unit 23 reports to the energy management system 18 which sends a command to stop operation of each bidirectional isolated control module 26, such that all battery modules 28 stop charging and discharging.

The technical features of the present invention have been set forth in detail. It should be appreciated that the present invention includes at least the following advantages after understanding the technical features of the present invention. For example, the voltage value of the DC bus 20 is decided by the operating power of the power conversion system 36 and the number of the bidirectional isolated control modules 26 in operation. The charging power and the discharging power of each bidirectional isolated control module 26 is decided by the voltage value of the DC bus 20. Thus, control of the charging power and the discharging power of plural bidirectional isolated control modules 26 can be easily achieved by controlling the operating power of the power conversion system 36.

The voltage value of the DC bus 20 is decided by the operating power of the power conversion system 36 and the number of the bidirectional isolated control modules 26 in operation. The charging power and the discharging power of each bidirectional isolated control module 26 is decided by the voltage value of the DC bus 20. Thus, when the bidirectional isolated control modules 26 of one or more battery clusters 24 malfunction due to some reasons, the power supply and storage device 10 may still operate normally as long as the remaining battery clusters 24 can support the power of the power conversion system 36.

Each battery module 28 is electrically isolated from the DC bus 20 and the power conversion system 36 via the bidirectional isolated control modules 26. Thus, hot swapping of each battery module 28 is permitted, thereby permitting replacement and repair of each battery module 28 without stopping the power supply and storage device 10.

According to equation (1) for calculating the voltage value of the DC bus 20, given that the operating power of the power conversion system 36 is unchanged, the stable voltage value of the DC bus 20 is changed when the number of the bidirectional isolated control modules 26 in operation is changed, such that the voltage value of the DC bus 20 can be controlled excellently, thereby rapidly controlling the operating power of each bidirectional isolated control module 26.

The battery modules 28 have the same charging current value (the same charging power) when in the charging state and have the same discharging current value (the same discharging power) when in the discharging state. Thus, the states of all cells 30 are similar to increase the system stability of the power supply and storage system 10 while reducing the malfunctioning probability.

Each battery module 28 is electrically isolated from the DC bus 20 and, thus, will not be affected by the DC bus, thereby reducing the damage probability of each battery module 28.

The battery modules 28 of each battery cluster 24 are connected in parallel, and the battery clusters 24 are also connected in parallel. Thus, the number of the battery modules 28 and/or the number of the battery clusters 24 can be increased or decreased according to the practical use without changing the voltage value outputted by each battery cluster 24. As a result, the amount of electricity stored by the power supply and storage device 10 can be adjusted more easily.

According to equation (3) for calculating the charging current value $I_1$ of each battery module 28 charged by the respective bidirectional isolated control module 26 and equation (4) for calculating the discharging current value $I_3$ of each battery module 28 discharged by the respective bidirectional isolated control module 26, the charging power and the discharging power of each battery module 28 can be excellently controlled in a preset range, thereby effectively prolonging the service life of each battery module 28.

The number of the serially connected cells 30 of each battery module 28 is controlled to be in a range of 10-20, such that the rated voltage value of each battery module 28 is low. For example, the rated voltage of sixteen (16) cells 30 connected in series is 51.2V. Thus, the working temperature of each battery module 28 is not high during charging and discharging, which saves the costs for disposition of an active type cooling system, reducing the risk of electric shock, and reducing the risk of fire due to high temperature.

The battery management system 32 of each battery module 28 may at least monitor the real-time temperature and the real-time voltage of each cell 30, such that the power supply and storage device 10 may reliably monitor the operating state of each cell 30, thereby increasing the overall stability while permitting timely repair and/or replacement of the battery module 28 having malfunctioning cells 30.

The power supply and storage device 10 monitors the cells 30 via the respective battery management system 32 and then sends the data (associated with operation of the cells 30) back to the battery cluster unit 23. Next, the battery cluster unit 23 organizes the monitored data associated with operation of the cells 30 and then send the organized data to the energy management system 18, such that the power supply and storage device 10 can excellently manage a large quantity of cells 30.

The power supply and storage device 10 according to the present invention may cooperate with the first power supply end 12 (such as a commercial power) providing alternating current and the second power supply end 14 (such as a solar power generating system) providing direct currently, thereby effectively increasing the use efficiency of electrical energy.

The battery cluster unit 23 independently detects whether the whole power storage system 22 generates smoke, flammable gases, volatile organic compounds, carbon monoxide, and/or hydrogen, assuring high safety during operation of the power supply and storage device 10.

Now that the basic teachings of the present invention have been explained, many extensions and variations will be obvious to one having ordinary skill in the art. For example, plural power storage systems 22 may be used. The bidirectional isolated control modules 26 of each power storage system 22 are electrically connected to the DC bus 20. The power storage systems 22 may be controlled to be identical in the charging current, the charging voltage, the discharging current, the discharging voltage, the charging power, and the discharging power.

Furthermore, as long as the battery modules 28 of each battery cluster 24 can withstand the maximum discharging power of the power supply and storage device 10, the number of the battery modules 28 of each battery cluster 24 may be varied.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A power supply and storage device comprising:

a directed current (DC) bus;

a power conversion system electrically connected to the DC bus, wherein the power conversion system is configured to be electrically connected to a first power supply end and to convert one of alternating current and direct current into another of the alternating current and the direct current; and plural battery clusters connected in parallel, wherein each of the plural battery clusters includes plural battery modules connected in parallel, wherein each battery module includes plural cells connected in series, wherein each battery cluster further includes a bidirectional isolated control module electrically connected to the DC bus, wherein each bidirectional isolated control module is electrically connected to the battery modules of a respective one of the plural battery clusters and electrically isolates the DC bus from each battery module, wherein a voltage value of the DC bus is decided by an operating power of the power conversion system and a number of the bidirectional isolated control modules in operation, and wherein when each bidirectional isolated control modules control charging and discharging of the respective battery cluster according to the voltage value measured on the DC bus, the bidirectional isolated control modules are identical in a charging current value and a charging voltage value during charging and are identical in a discharging current value and a discharging voltage value during discharging.

2. The power supply and storage device as claimed in claim 1, wherein a voltage value of the DC bus in operation is between a first voltage value and a second voltage value greater than the first voltage value, wherein a stable voltage value of the DC bus is calculated by equation (1):

$$V_{sc}=(P_1/P_2)*(V_2-V_c)+V_c \quad (1)$$

wherein $V_{sc}$ is the stable voltage value of the DC bus during charging, $V_2$ is the second voltage value, $V_c$ is an initial charging voltage value, $P_2$ is the rated charging power of each bidirectional isolated control module, $P_1$ is a charging power of each bidirectional isolated control module and is equal to $OP/N_b$, wherein OP is an operating power of the power conversion system, and $N_b$ is the number of the bidirectional isolated control modules in operation.

3. The power supply and storage device as claimed in claim 2, wherein when each battery module is discharging, the stable voltage value is calculated by equation (2):

$$V_{sd}=V_d-(P_3/P_4)*(V_d-V_1) \quad (2)$$

wherein $V_{sd}$ is a stable voltage value of the DC bus during discharging, $V_d$ is an initial discharging voltage value, $P_4$ is a rated discharging power of the bidirectional isolated control module, and $V_1$ is the first voltage value, $P_3$ is a practical discharging power of each bidirectional isolated control module and is equal to $OP/N_b$, wherein OP is the operating power of power conversion system, and $N_b$ is the number of the bidirectional isolated control modules in operation.

4. The power supply and storage device as claimed in claim 3, wherein the charging current value of each battery module charged by the respective bidirectional isolated control module and the discharging current value of each battery module discharged by the respective bidirectional isolated control module are respectively calculated by equations (3) and (4):

$$I_1=I_2*(V_b-V_c)/(V_2-V_c) \quad (3)$$

$$I_3=I_4*(V_a-V_b)/(V_d-V_1) \quad (4)$$

wherein $I_1$ is the charging current value of each battery module charged by the respective bidirectional isolated control module, $I_2$ is a rated charging current of each battery module, $V_b$ is a measured real-time voltage value of the DC bus, $V_c$ is an initial charging voltage value, $V_2$ is the second voltage value, $I_3$ is the discharging current value, $I_4$ is a rated discharging current of each battery module, $V_d$ is the initial discharging voltage value, and $V_1$ is the first voltage value, and wherein the initial charging voltage value $V_c$ is greater than the initial discharging voltage value $V_d$ by a value in a range of 5-20V.

5. The power supply and storage device as claimed in claim 1, wherein a number of the plural cells connected in series is in a range of 20-30, and wherein a working voltage of each battery module is in a range of 40-60V.

6. The power supply and storage device as claimed in claim 1, wherein each battery module includes a battery management system electrically connected to each cell, wherein each battery management system controls a voltage value of each cell after charging to be within a range of allowable error which is ±0.01V-±0.1V.

7. The power supply and storage device as claimed in claim 1, wherein each battery module includes a battery management system electrically connected to each cell, wherein each battery management system monitors operational data of each cell including at least a real-time temperature of each cell, wherein when the real-time temperature of one of the plural cell is higher than a preset temperature, a respective one of the bidirectional isolated control modules associated with the one of the plural cells whose real-time temperature is higher than the preset temperature stops charging and/or discharging of a respective one of the plural battery modules associated with the one of the plural cells whose real-time temperature is higher than the preset temperature.

8. The power supply and storage device as claimed in claim 1, further comprising:

an energy management system electrically connected to the power conversion system and each bidirectional isolated control module, wherein when each battery cluster is charging, the energy management system controls the power conversion system to convert the alternating current supplied by the first power supply end into the direct current which is supplied to the DC bus, wherein each bidirectional isolated control module uses the direct current of the DC bus to charge the respective battery modules, wherein when each battery cluster is discharging, the respective bidirectional isolated control module uses electricity of the respective battery cluster to generate direct current at the DC bus, and wherein the power conversion system converts the direct current generated at the DC bus into alternating current to be used by at least one load; and a battery cluster unit electrically connected between the energy management system and each battery cluster, wherein each battery module includes a battery management system electrically connected to each cell, wherein the battery management system of each battery module captures an operational data of each of the associated cells and sends the operational data to the battery cluster unit, wherein the battery cluster unit sends the operational data to the energy management system, wherein the operation data includes a real-time voltage value and a real-time temperature of each of the associated cells, wherein when the energy management system detects that one of the plural cells has an abnormal real-time voltage value, a respective one of the bidirectional isolated control modules associated with the one of the plural cells having the abnormal temperature stops charging and/or discharging of the respective one of the battery modules associated with the one of the plural cells having the abnormal temperature.

9. The power supply and storage device as claimed in claim 1, further comprising a second power supply end comprised of at least one of a green energy system and a recycling power generating system, wherein the second power supply end is electrically connected to the DC bus and is configured to be electrically connected to at least one load, wherein the first power supply end supplies alternating current, wherein the power conversion system converts the alternating current of the first power supply end into direct current which is delivered to the DC bus, wherein each bidirectional isolated control module uses the direct current of the DC bus to charge each battery cluster, and wherein the power conversion system is capable of converting the direct current released from each battery cluster into alternating current to be supplied to the at least one load.

10. The power supply and storage device as claimed in claim 1, further comprising:

an energy management system electrically connected to the power conversion system and each bidirectional isolated control module, wherein when the energy management system controls the power conversion system to convert the alternating current supplied by the first power supply end into the direct current and delivers the direct current to the DC bus, each bidirectional isolated control module uses the direct current of the DC bus to charge the respective battery modules, wherein when the energy management system controls the power conversion system to supply electricity to at least one load, each bidirectional isolated control module uses the electricity of the respective battery cluster to generate direct current on the DC bus, and wherein the power conversion system converts the direct current generated on the DC bus into alternating current to be supplied to the at least one load; and a battery cluster unit electrically connected between the energy management system and each battery cluster, wherein the battery cluster unit is configured to detect whether each battery cluster generates at least one of smoke, flammable gases, volatile organic compounds, carbon monoxide, and hydrogen, and wherein when presence of any one of the generates smoke, flammable gases, volatile organic compounds, carbon monoxide, and hydrogen is detected by the battery cluster unit, the energy management system stops operation of each bidirectional isolated control module, such that all battery modules stop charging and discharging.

* * * * *